(No Model.) 4 Sheets—Sheet 1.
M. P. DENNEY.
COMBINED HAY RAKE AND TEDDER.
No. 349,484. Patented Sept. 21, 1886.
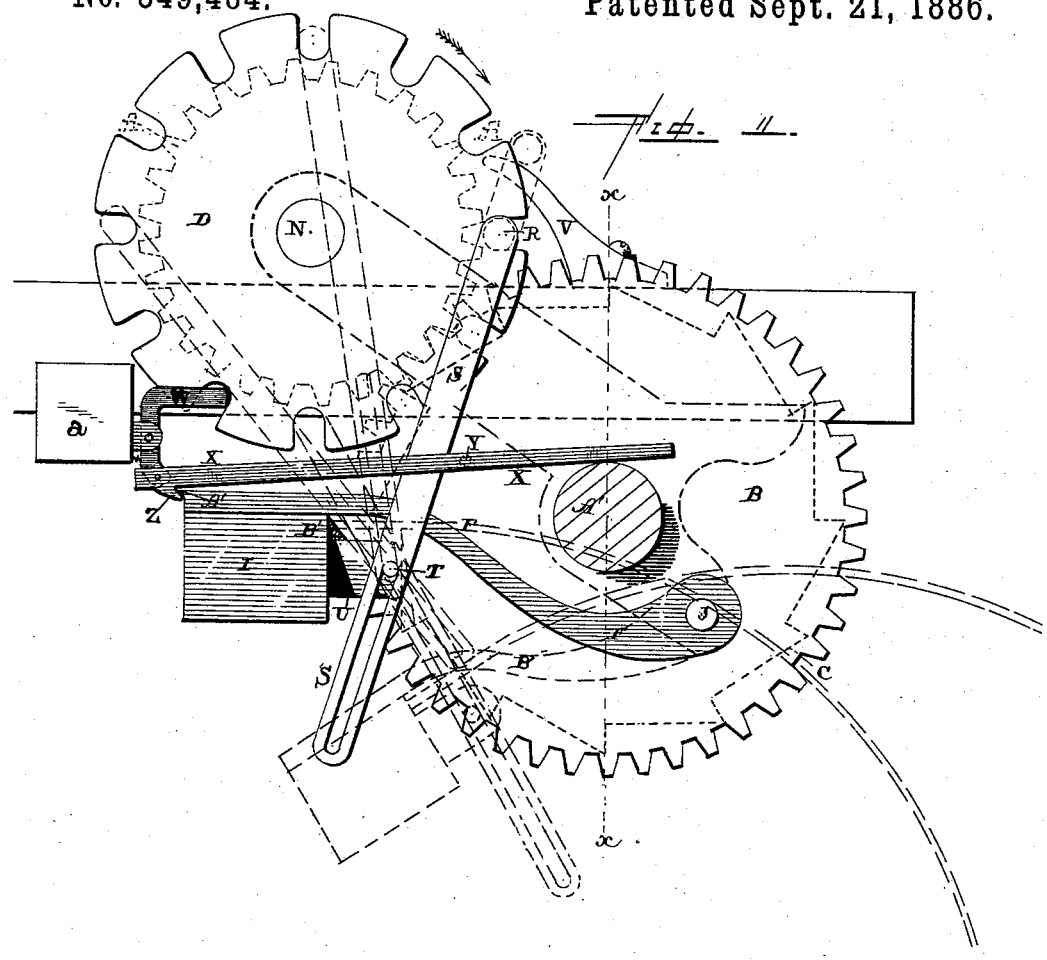
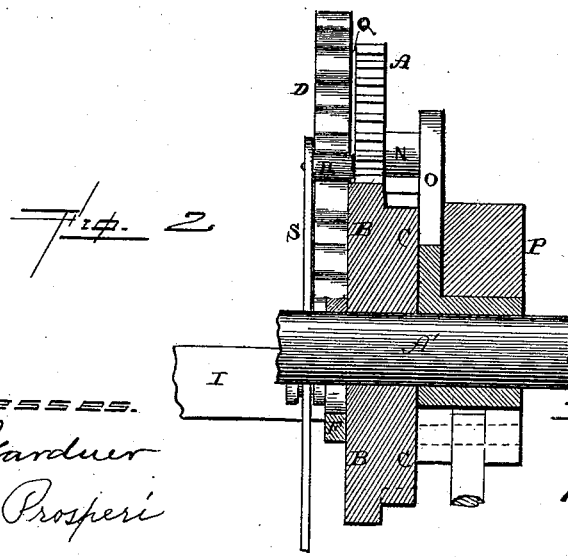
Witnesses.
R. F. Gardner
Jno. E. Prosperi
Inventor.
M. P. Denney,
per J. A. Lehmann, Atty.

(No Model.)  
4 Sheets—Sheet 2.
M. P. DENNEY.
COMBINED HAY RAKE AND TEDDER.
No. 349,484. Patented Sept. 21, 1886.
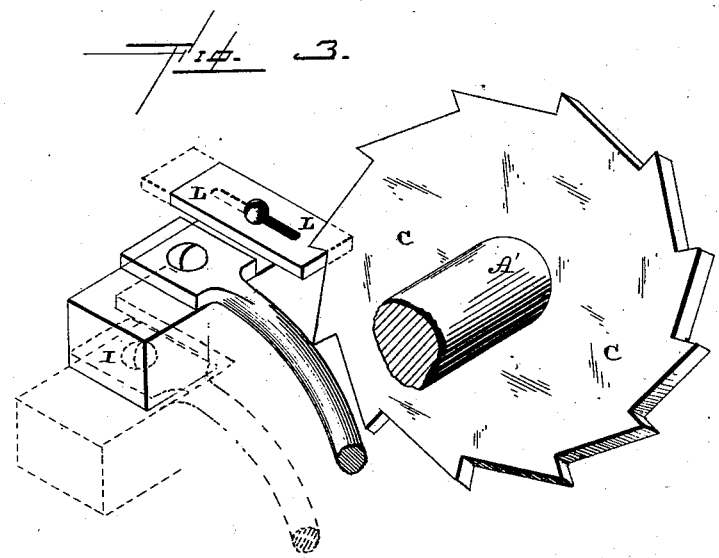

(No Model.) 4 Sheets—Sheet 3.
M. P. DENNEY.
COMBINED HAY RAKE AND TEDDER.
No. 349,484. Patented Sept. 21, 1886.
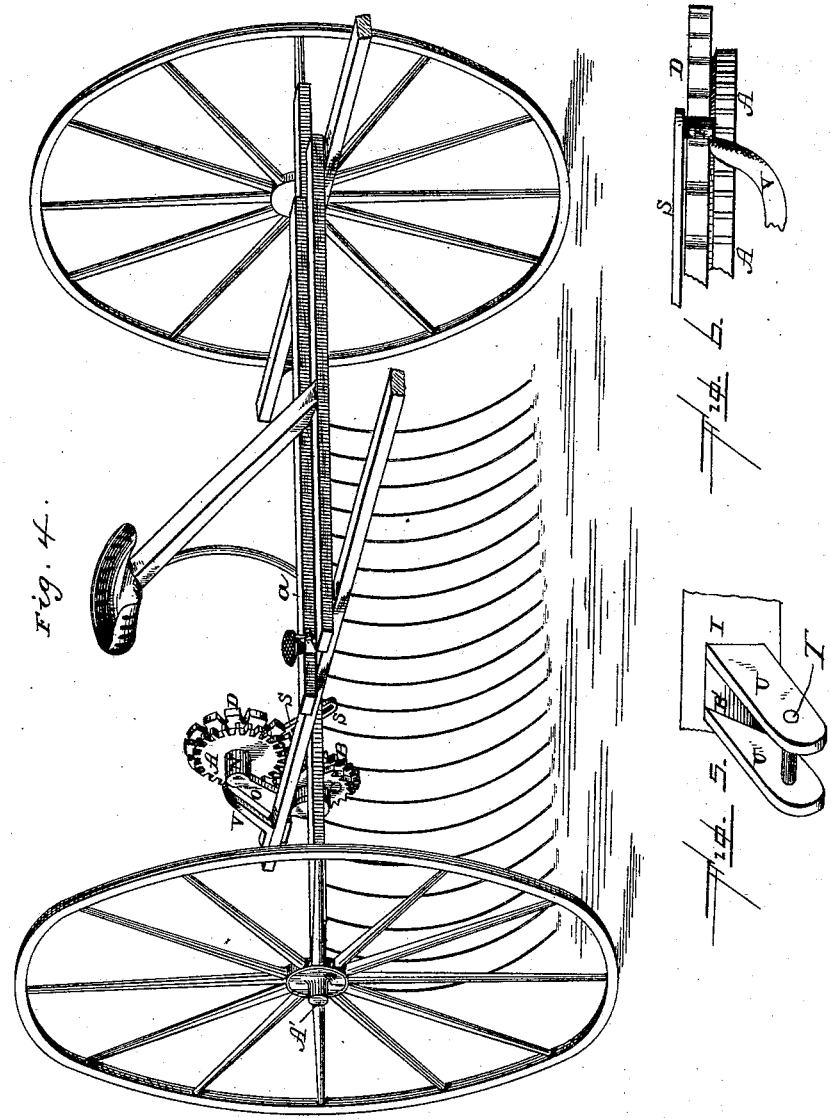
Witnesses:
W. H. Babcock
L. Deane
Inventor:
M. P. Denney
per
F. A. Lehmann,
Atty

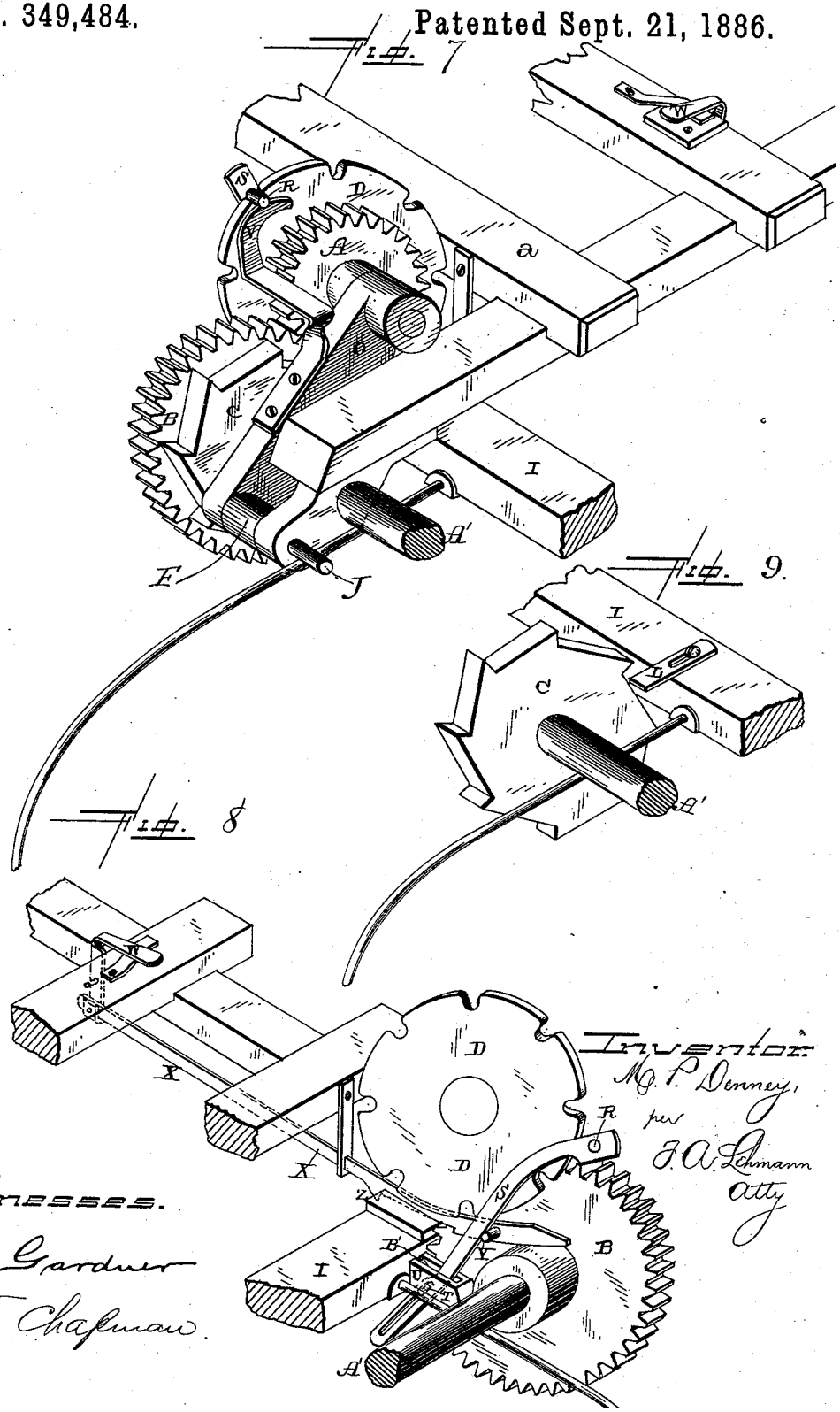

UNITED STATES PATENT OFFICE.

MIFFLIN P. DENNEY, OF NEW YORK, N. Y., ASSIGNOR TO FRED A. LEHMANN, OF WASHINGTON, DISTRICT OF COLUMBIA.

COMBINED HAY RAKE AND TEDDER.

SPECIFICATION forming part of Letters Patent No. 349,484, dated September 21, 1886.

Application filed July 21, 1885. Serial No. 172,336. (No model.)

*To all whom it may concern:*

Be it known that I, MIFFLIN P. DENNEY, of New York city, in the county of New York and State of New York, have invented certain new and useful Improvements in a Combined Hay Rake and Tedder; and I do hereby declare the following to be a full, clear, and exact description of the invention, such as will enable others skilled in the art to which it pertains to make and use it, reference being had to the accompanying drawings, which form part of this specification.

My invention relates to an improvement in a combined hay rake and tedder; and it consists in, first, the combination of a ratchet-wheel, which is secured to and revolves with the axle, with the movable rake-head, which is secured to pivoted arms, and an adjustable device which is attached to the rake-head, and which can be brought into operation with the ratchet-wheel when it is desired to use the machine as a tedder alone; second, the combination of a main axle, a gear secured thereto, and a gear which operates a toothed wheel, with slotted levers provided with a pin or projection at its upper end to engage with the toothed wheel, and the movable rake-head, whereby when the upper end of the lever is made to engage with the toothed wheel the rake is made to dump its load; third, the combination of the toothed wheel, the slotted lever provided with a projection at its upper end, and a suitable mechanism whereby the lever is made to engage with the wheel at any time it may be desired; fourth, the combination of the toothed wheel, the slotted lever, and the movable rake-head, the mechanism for throwing the lever into operation with the toothed wheel, and a horn or other device which throws the lever out of operation with the wheel after the wheel has made one revolution; fifth, the combination of the movable rake-head provided with a projection upon its front edge with a movable lever or rod which is provided with another projection for catching under the projection on the head, and thus preventing the rake-head from being drawn downward, all of which will be more fully described hereinafter.

The object of my invention is to provide a self-dumping hay-rake with a single wheel and an adjustable device which is placed upon the rake-head, whereby the rake is converted into a combined rake and tedder at a very slight expense.

Figure 1 is a vertical section of a combined hay rake and tedder embodying my invention, the treadle being placed upon the rear cross-bar, and the slotted lever being shown as straight. Fig. 2 is a vertical section taken upon the dotted lines $x$ $x$ of Fig. 1. Figs. 3 and 9 are perspectives of the tedder mechanism, taken from opposite sides. Fig. 4 is a perspective taken from the front of the machine, the treadle being shown in a slightly different position from that shown in Fig. 1. Figs. 5 and 6 are detail views of the different parts. Figs. 7 and 8 are perspectives of the operating mechanism, taken from opposite sides, the treadle being placed farther forward than is shown in Fig. 1, and the slotted lever being shown curved, instead of straight.

A' represents the main axle, which is supported in the usual manner at each end upon driving-wheels. Rigidly secured to this axle is the ratchet-wheel C, which is cast in a single piece with the cog-wheel B. Although this ratchet-wheel revolves with the shaft, it performs no work except when the machine is to be used as a tedder. At all other times it revolves idly around. The rake-head I is suspended by means of the arms F a suitable distance in advance of the axle, and has the rake-teeth secured to it in such a manner that about three-fourths of the weight of the teeth and the head is brought to bear through the swinging arms F upon the pivots J, which are placed back of the axle, in contradistinction to having the weight applied directly to the axle in the usual manner. One-fourth of the weight coming in front of the axle a suitable distance, and the other three-fourths back of it, the teeth can be made to dump their load much more easily than where the whole weight is brought to bear on the axle. There are two of these arms F—one near each end of the axle and rake-head—and these arms allow the rake-head to swing freely through a portion of a circle both when the machine is being used as a tedder and as a hay-rake.

When the machine is used as a tedder, it is only necessary to move the catch L forward so that each tooth of the ratchet-wheel C will alternately strike it, and thus cause the rake-head to be depressed by every tooth of the ratchet-wheel. The head I of the rake, being supported by the rake-teeth and the arms F, has a free rising and falling movement for the purpose of raising the lower ends of the teeth from the ground in the usual manner to discharge or release the hay from them. This movement of the head I when caused by the slotted rod S is shown in Fig. 1 by dotted lines, and in Fig. 3 in dotted lines when caused by the downward pressure of the teeth of the ratchet-wheel upon the top of the rear end of the catch L. This catch consists of a slotted metallic plate which is secured to the rake-head, and which is only brought into use when the machine is to be used as a tedder. At all other times it is pushed back out of action, and then the ratchet-wheel is not brought into operation. As each tooth of the ratchet-wheel strikes the catch, the rake-head is depressed so as to throw up the lower ends of the rake-teeth just far enough to discharge the hay, and then, as each tooth passes on beyond the catch, the rake-head is instantly thrown upward into position again by the weight of the teeth acting in the rear of the pivots, so that the teeth are again brought into operation. As the rake-head is thus operated about every foot, the hay is raked up into small bundles, so as to readily dry.

While the machine is being used as a tedder, the driver must keep the treadle W slightly depressed, so that the lever X will be moved just far enough forward to detach the catch Z from the rake-head, and thus leave the head free to be operated by the ratchet-wheel C and slide L. While being used as a tedder, only the ratchet-wheel C, the slide L, and the rake are brought into operation. When used as a hay-rake alone, the ratchet-wheel and slide are not brought into use at all, while the other parts, described hereinafter, are brought into operation at the will of the driver.

The only change necessary to convert the machine from a tedder to a hay-rake is to move the slide L forward, and from a hay-rake to a tedder is to move the slide back and slightly depress the treadle, so as to leave the head free to move.

The cog-wheel B is larger than the ratchet-wheel C, and meshes with a similar wheel, A, which is cast in a single piece with the wheel D, of larger diameter. These two wheels A D are journaled upon the stationary stud N, which passes through and is rigidly secured to the web O, which extends up from the box in which the axle is journaled, and which box is secured to the under side of one of the thills P. The two wheels are slightly separated from each other by a groove, Q, at their inner edges, as shown, to allow the pin on the operating-lever to pass through beyond the edge of the wheel D. The teeth of the wheel D may either be made of the shape here shown or any other that may be preferred, as their only office is to engage with the pin R on the upper end of the slotted lever S. This lever is pivoted upon the pin T, which is passed through the two ears U, which are secured to the rear side of the rake-head I.

When the machine is being used as a hay-rake, the pin R is made to engage with one of the teeth of the wheel D whenever so desired, and then, as the wheel revolves, the lever S forces the rake-head downward and backward far enough to raise the lower ends of the rake-teeth and discharge the hay in regular windrows. This downward movement of the rake-head is made during the first quarter-revolution of the wheel D, and during the second quarter the rake-head is being returned to position, so as to again bring the teeth into operation. During the second half of the revolution of the wheel D the rake-head is not moved, but the lever S is being carried up and around, as shown by dotted lines. When the upper end of the lever reaches the horn or projection V, which is secured on top of one of the thills, the pin R catches on the inclined top of the horn, and the upper end of the lever is thus forced backward, so as to throw it out of gear with the wheel D. The lever then remains out of operation until the driver chooses to bring it into operation again, and thus the distance between the windrows is regulated at will.

For the purpose of bringing the lever S into operation whenever desired, there is a treadle, W, pivoted upon the cross-bar a, and the lower end of this treadle is connected to the endwise-moving rod X, provided with a pin, Y. When the rod X is forced endwise by the movement of the treadle, the pin Y catches against the rear edge of the lever S and forces it forward, so that the projection R again enters one of the notches in the wheel D. A spring of any suitable kind is applied to the lower end of the treadle, so as to keep the rod forced backward and the projection away from the lever S until it is desired to move the lever.

In order to prevent the rake-head from dropping downward from any cause, there is a hook or catch, Z, secured to the under side of the rod X, which engages with a projection, A', on the top of the rake-head. When the rod X is moved, it first disengages the hook Z and projection A', so that the head is free to be carried down by the pressure of the hay against the rake-teeth before it brings the lever S into operation.

In order to prevent the lever S from having its pin R forced out of its notch in the wheel D when the wheel has just completed its first half-revolution, there is a projection, B', formed in between the ears U, and which allows the lever S to be moved just far enough to follow the movement of the wheel, but no farther. This construction dispenses with the necessity of a special guard to keep the pin R in its notch in the wheel.

It is not necessary that the projection Z should be formed on the lever X, for it may be formed on some other part which is provided for this purpose, and which may or can be separately moved.

By means of the construction above described the rake-head is allowed to return slowly to position as the front end of the slotted lever L rises upward from underneath the wheel A, and thus the lower ends of the teeth are prevented from striking against the ground, as they otherwise would do if the rake-head were allowed to suddenly fly upward. The locking device serves to prevent the rake-head from being forced downward at any time, except when it is so desired by the operator, and thus the lower ends of the teeth can never rise upward so as to leave a portion of the field unraked. As about three-fourths of the weight of the teeth is placed in front of the axle and only about one-fourth to its rear, the teeth can be raised much more easily, and thus a less strain is brought to bear upon the horse than if the teeth were attached in the usual manner. By the addition of the ratchet-wheel and the slide upon the top of the rake-head the rake is converted into a combined rake and tedder at but a very slight expense.

In Fig. 1 the treadle is secured to the cross-bar A on the under side of the shafts much nearer the operating parts than is shown in Figs. 7 and 8. This is a mere matter of convenience, and depends entirely upon the location of the seat. The lever S may be either straight, as shown in Fig. 1, or curved, as shown in Fig. 8, as may be preferred. These are mere variations in the detail of construction, without departing from the spirit of my invention.

As here shown, the wheel A and notched disk D are cast in a single piece; but it is evident that these two parts may be separately formed and then rigidly secured to the shaft or journal N, so as to revolve together.

Having thus described my invention, I claim—

1. The combination of the axle, the ratchet-wheel secured thereto, the rake-head located in front of the axle and supported in position by pivoted arms, and a slide or other device placed upon the rake-head, and which slide can be made to engage with the ratchet-wheel when it is desired to use the machine as a tedder, substantially as shown.

2. The combination of the axle, a gear-wheel secured thereto, a second gear-wheel which meshes with the one secured to the axle, the notched disk D, a slotted lever which is supported upon the pin T, and which has a pin upon its upper end to engage with the notches in the periphery of the disk, a movable rake-head, to which the slotted lever is connected, and the pivoted arms upon which the rake-head is supported in position, substantially as described.

3. The combination of the disk D, provided with notches in its periphery, the slotted lever provided with a pin upon its upper end, a movable rake-head which is secured to swinging arms, and a suitable mechanism for throwing the lever into gear with the wheel A, substantially as set forth.

4. The combination of the disk D, having notches in its periphery, the slotted lever having a pin upon its upper end to engage with the disk, the pin T upon the rake-head, and which passes through the slot in the lever, the rake-head secured to swinging arms, and a horn or other device for disengaging the upper end of the lever from the wheel after it has made one revolution, substantially as specified.

5. The combination of the disk D, having notches in its periphery, the slotted lever S, supported at its lower end upon the pin T and provided at its upper end with the pin R, to engage with the notches in the disk D, the movable rake-head, which is secured to the pivoted arms F and placed in front of the axle, a mechanism for throwing the lever out of gear with the wheel whenever so desired, and the device for throwing the lever out of gear with the wheel after it has made one revolution, substantially as shown.

6. The combination of the rake-head secured to swinging arms and provided with a projection upon its front edge with an endwise-moving lever provided with a projection, whereby the rake-head is prevented from dropping downward, substantially as described.

7. The combination of the disk D, having notches in its periphery, the slotted lever provided with a pin at its upper end to engage with the disk, the pin T on the rake-head, and an endwise-moving lever, X, provided with a projection, Y, which catches behind the edge of the slotted lever for the purpose of throwing the lever into gear with the disk, substantially as specified.

8. The combination of the disk D, provided with suitable notches in its periphery, the slotted lever provided with a pin upon its upper end, the pin T, and a movable rake-head secured to swinging arms and provided with a projection on its front edge, with the endwise-moving lever X, provided with a projection to move the slotted lever, and a second projection, Z, to catch under the projection on the front edge of the rake-head, substantially as shown.

9. The combination of the disk D, having notches in its periphery, the lever S, slotted at its lower end and provided with a pin at its upper end, the ears U, the pivot T, on which the lever S moves, and the projection B', formed between the ears, for limiting the forward movement of the lever S, substantially as described.

In testimony whereof I affix my signature in presence of two witnesses.

MIFFLIN P. DENNEY.

Witnesses:
H. DENNEY,
R. KRUGER.